Aug. 25, 1953
R. W. RAY
2,649,982
BALE SLED
Filed Jan. 23, 1951
3 Sheets-Sheet 1
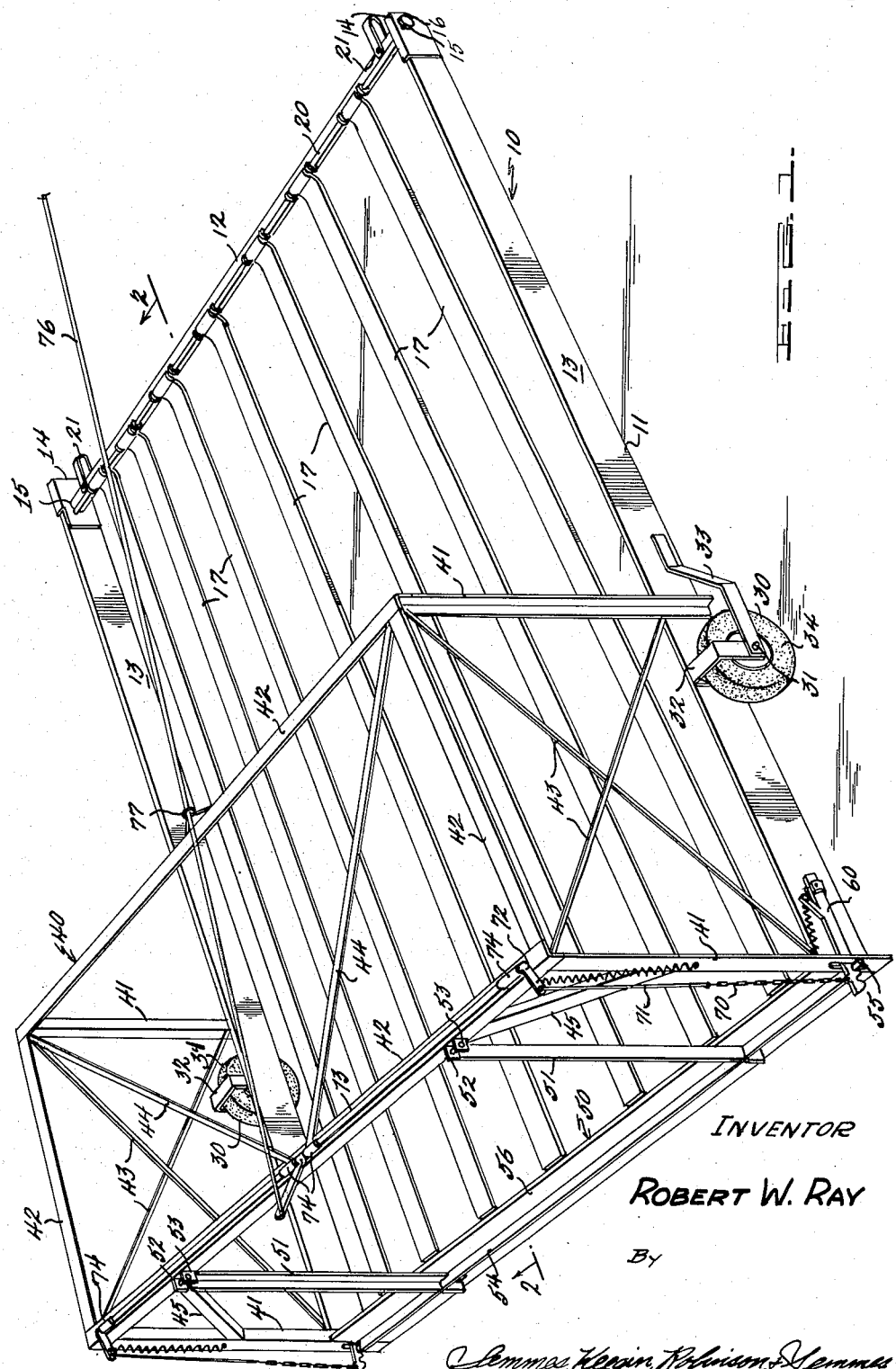
INVENTOR
ROBERT W. RAY
By
*Semmes, Keegin, Robinson & Semmes*
ATTORNEYS

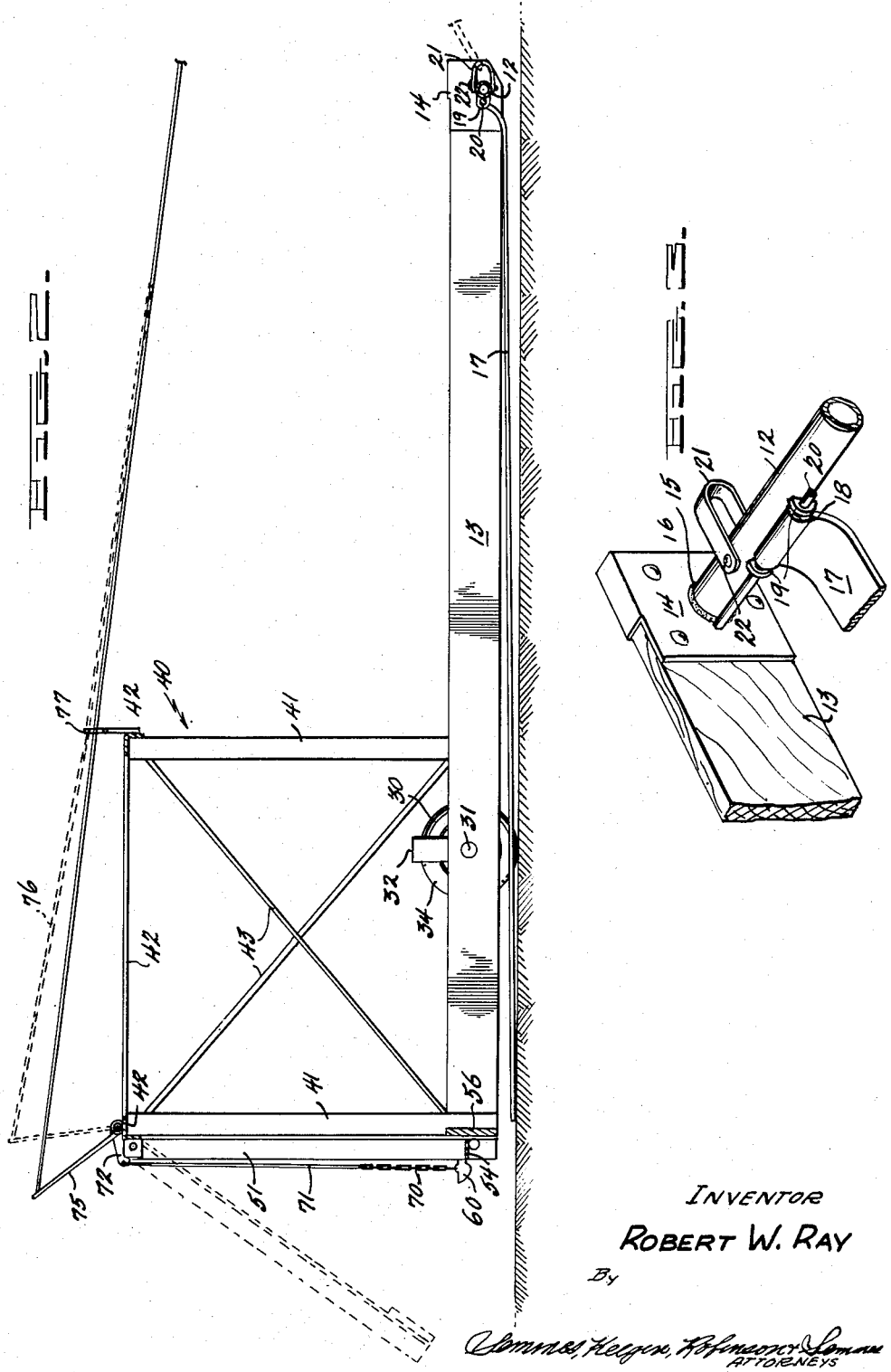

Aug. 25, 1953 R. W. RAY 2,649,982
BALE SLED

Filed Jan. 23, 1951 3 Sheets-Sheet 3

INVENTOR.
ROBERT W. RAY
BY
*Semmes, Keegin, Hofmann & Semmes*
ATTORNEYS

Patented Aug. 25, 1953

2,649,982

UNITED STATES PATENT OFFICE 2,649,982

BALE SLED

Robert W. Ray, Dearborn, Mo.

Application January 23, 1951, Serial No. 207,266

1 Claim. (Cl. 214—353)

This invention relates to a portable bale sled and has specific reference to a bale sled for receiving and discharging selected quantities of bales of hay, straw and the like as they are dropped from a baling machine.

Heretofore, various means have been devised for collecting and discharging bales of hay and straw. Most of these devices consist of windrowers, hoppers or skids of complex structure which are cumbersome, easily damaged and expensive to manufacture. These devices either carry the bales at a considerable height above the ground or else the bales cannot be released from the rear of the device at will while it is being drawn over the ground.

Therefore, it is a primary object of the present invention to overcome the deficiencies in bale collecting and discharging devices heretofore developed.

Another object of this invention is to provide a bale sled to be drawn behind a hay baler so that as the bales come out of the baler they are discharged onto the sled, and so that when a sufficient number have been collected, they are discharged in one pile by unlatching a rear swinging gate of the sled.

Still another object of this invention is to provide a bale sled for the purpose described which has a frame supported by wheels and in which the bales ride on hinged slats which drag on the ground toward the rear of the sled, and wherein means are provided for preventing the bales from sliding off the rear-end of the sled.

Yet another object of this invention is to provide a bale sled for the purpose described having an end gate at the rear thereof which is hinged at the top to swing out at the bottom and release bales as they are dragged rearwardly on the sled by friction with the ground.

A further object of this invention is to provide a bale sled for the purpose described which is sturdy and yet of simple construction and which is inexpensive to manufacture.

With these and other objects and advantages in view, which will become more apparent during the course of the following description, the invention consists in the features and combinations hereinafter set forth.

In order to make the invention more fully understood, preferred embodiments thereof have been made the subject of illustration in the accompanying drawings in which:

Figure 1 is a perspective view of the bale sled of this invention;

Figure 2 is an elevational cross section of the device of Figure 1 taken along the lines 2—2 thereof;

Figure 3 is a fragmentary view showing how the slats forming the floor of the bale sled are hinged to the front cross member thereof;

Figure 4:
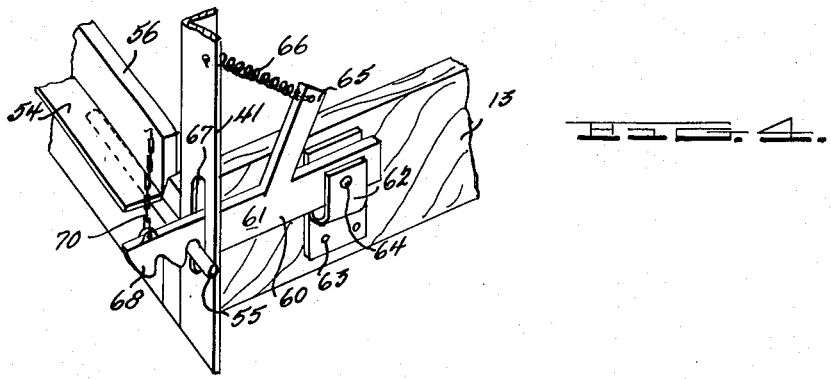
Figure 4 is a fragmentary view showing the details of the latch mechanism for the rear end gate.
Figure 5:
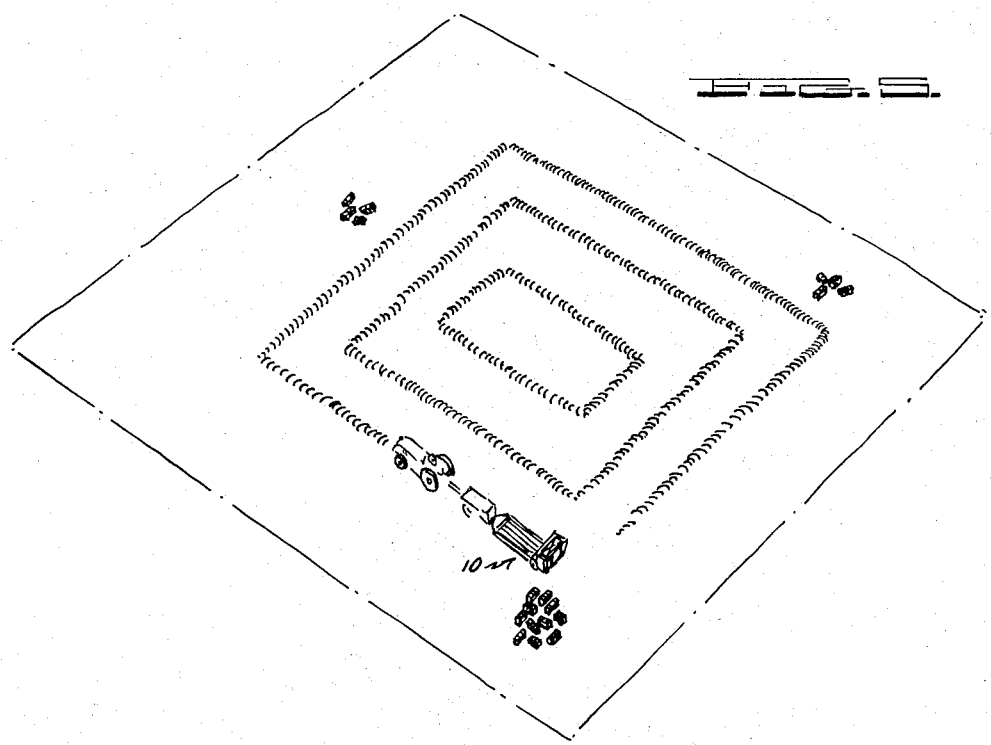
Figure 5 is a perspective view of a field showing the relative operating positions of a tractor, a baler and the bale sled as they move past a number of bales that have been dumped in a pile.

In its briefest form, the present invention embodies a bale sled comprising a frame having a front and rear end. A gate having a top and bottom edge closes the rear end of the frame. This gate is hinged along its top edge to a support structure at the rear of the sled so that the bottom edge of the gate may swing out from the frame to open the rear end of the sled. A latch mechanism is further provided for opening and closing the end gate as desired. A floor for the sled consists of spaced parallel slats which are hinged to the sled at the forward end thereof and dragged on the ground toward the rear end of the sled. Since the slats are so close to the ground and are spaced from one another, there is some friction between the ground and the bales on the floor of the sled; thus the bales are constantly being urged to the rear of the sled and against the end gate.

Referring to the drawings, Figure 1 shows the bale sled of this invention generally designated as 10 having a frame structure 11. The frame structure consists of a front cross member 12 preferably made of iron pipe, which constitutes the front end of the frame. Side members 13 are provided which are preferably made of lumber. A metal shoe 14 is provided on the forward end of each side member to reinforce same. This shoe is rounded on the forward under edge to enable the sled to slide easily over rough ground. An opening 15 is defined in the shoe and side member for engaging the end of the cross member 12. A pin 16 through the end of the member 12 secures same to each side member.

Between the side members 13 is formed a floor for the sled comprising spaced parallel slats 17 preferably made of iron bars. The slats 17 are hinged to the front cross member 12 as shown in Figure 3. The front end of the slat may be rolled to form an eye 18. Member 12 has spaced brackets 19 welded thereto, and a rod 20 passing through the brackets 19 and the eye 18 secures the slats in hinged engagement to the front member 12. A drag hitch 21 consisting of a U- shaped iron bar is attached to the front member 12 by a pin 22 passing through the member.

Intermediate the ends of the bale sled are wheels 30, one positioned on each side of the sled and approximately two-thirds of the way toward the rear of the sled. These wheels are carried on the frame member 13 by an axle 31 which is supported on its outer end by overhead brace 32 and side brace 33. The wheels 30 preferably have pneumatic tires 34 thereon for better traction and softer riding of the sled. It should be noted that the braces not only support the outer end of the axle 31 but also act as guards to the wheels.

At the rear end of the sled is a support structure generally designated as 40. This structure comprises vertical angle irons 41 and upper horizontal angle irons 42. At each side of the support structure are cross braces 43 preferably made of strap iron. Diagonal braces 44 of strap iron strengthen the upper part of the support structure. At the rear face of the support structure across each corner of the top thereof are braces 45 also made from angle iron.

At the extreme rear of the sled and depending from the rear end of the support structure is an end gate 50. This end gate has two upright angle irons 51 which are hinged at their upper ends to the rear angle iron 42 by brackets 52 which are welded to angle iron 42 and have eye bolts 53 passing through the brackets and angle irons 51. At the bottom of the end gate is a cross member 54 with an iron rod 55 welded to each end thereof. A board 56 is secured to the member 54 to close the end of the frame for the bale sled.

At the rear end of the frame on each side thereof is a latch mechanism generally designated as 60 for opening and closing the end gate. As shown in Figure 4, a latch arm 61 is pivoted towards its rear end on a bracket member 62 which is secured to the side member 13 by bolts 63. A pivot pin 64 passes through the bracket 62 and the arm 61 as shown. In order to hold the arm 61 in the downward position, a side extension 65 is provided, and a spring 66 engages the end of the extension 65 and the angle iron 41. The forward end of the arm 61 passes through a slot 67 in the angle iron 41. This forward end of the arm 61 is provided with a plurality of hooks 68 for engaging the rod 55 on the end of the cross member 54, thus keeping the end gate in closed position.

In order to lift the latch 60 so that the end gate may swing open, a chain 70 is secured to the forward end of the arm 61. The upper end of the chain is fastened to the lower end of a rod 71. The upper end of the rod 71 is hooked onto a crank arm 72 carried on the end of an upper horizontal trip rod 73. A plurality of eyelet members 74 are welded to the angle irons 42 at the rear of the support structure for carrying the trip rod 73 thereon in free rotative movement. At the center of the trip rod 73 is a lever arm 75 for rotating the trip rod 73 within the eyelets 74 and thus actuate the latch arms 61 at each side of the frame. A rope or chain 76 is fastened to the upper end of the lever 75 and passes through an eyelet loop 77 which is welded to the forward angle iron 42 of the support structure for guiding the rope. Of course, this rope extends forward far enough so that a tractor driver may trip the latch mechanism and open the end gate from the driver's seat.

Having described the invention in detail, its operation should be rather apparent. However, it should be further emphasized that friction of a bale of hay or straw with the ground causes the bale to move to the rear of the sled on the slats until it strikes the end gate. The bales thus moved to the rear of the sled ride on the slats until the end gate is tripped, and then a number of bales are discharged in one pile. As constructed, the bale sled usually carries between 10 and 12 bales before discharging them in one pile.

When a sufficient number of bales have accumulated in the sled, and the trip rope is pulled to unlatch the end gate so that it will swing out at the bottom, the bales, because of friction contact with the ground, will remain approximately stationary thus forcing the end gate open as the sled moves forward. When the bales have been discharged and the end gate falls to the closed position, the latter will at least close under the first hook 68 of the latch arm even though it does not come down with sufficient force to completely close. In any event, the driver will not have to stop the tractor and get off to close the end gate by hand. The end gate will normally fall closed entirely by virtue of its own weight.

While the invention has been described with reference to particular embodiments, it is contemplated that modifications thereof may be made without departing from the spirit of the invention. Accordingly, it is intended that the scope of the invention be limited only as defined in the appended claim.

I claim:

A bale carrier comprising a shallow, rectangular bed including transversely spaced side members connected at their forward ends by a cross bar which is elevated above the lower edges of the side members, a pair of wheels mounted aft of the longitudinal center of respective side members, supporting the rear of the side members of the bed above but relatively close to the gound, a plurality of parallel slats individually hinged at their forward ends to said elevated cross bar and extending to the rear portion and forming the floor of said bed, said slats lying entirely within the vertical and rectangular confines of the bed and in sliding engagement with the ground and being transversely spaced to expose a major area of the ground beneath the bed, a forwardly open bale retaining cage overlying the rear portion of the bed and consisting of opposed rectangular side frames secured in vertical position on respective side members and connected by a rectangular horizontal top frame, a gravity closed end gate forming the rear wall of said cage, hingedly connected at its upper edge to the top frame of said cage, for free swinging movement about a horizontal axis, with respect to the rear end of said bed, a spring urged latch for normally locking said end gate in closed position and means for releasing said latch, whereby upon forward movement of the bed, a quantity of bales accumulated in said bed are progressively urged rearwardly against said gate by inter-slat contact with the ground, to force the gate outwardly upon release of said latch.

ROBERT W. RAY.

References Cited in the file of this patent

UNITED STATES PATENTS

| Number | Name | Date |
| --- | --- | --- |
| 99,766 | Eddelman | Feb. 15, 1870 |
| 104,233 | Waste | June 14, 1870 |
| 1,225,031 | Heiden | May 8, 1917 |
| 1,371,036 | Le Force | Mar. 8, 1921 |
| 2,221,719 | Peterson | Nov. 12, 1940 |